W. N. SPRAGUE.

MACHINE FOR MAKING WOODEN SHANKS FOR BOOTS AND SHOES.

No. 6,828. Reissued Dec. 28, 1875.

Witnesses.
S. W. Piper.
L. W. Miller

Watson N. Sprague
by his attorney.
R. H. Eddy.

UNITED STATES PATENT OFFICE.

WATSON N. SPRAGUE, OF SOUTH FRAMINGHAM, ASSIGNOR, BY MESNE ASSIGNMENTS, TO HIMSELF AND WM. W. POTTER, OF BOSTON, MASS.

IMPROVEMENT IN MACHINES FOR MAKING WOODEN SHANKS FOR BOOTS AND SHOES.

Specification forming part of Letters Patent No. 157,424, dated December 1, 1874; reissue No. 6,828, dated December 28, 1875; application filed November 16, 1875.

*To all whom it may concern:*

Be it known that I, WATSON N. SPRAGUE, late of Keene, of the State of New Hampshire, but now of South Framingham, of the State of Massachusetts, have invented certain new and useful Improvements in Machines for Making Wooden Shanks for Boots or Shoes; and do hereby declare the same to be described in the following specification and represented in the accompanying drawings.

The invention is intended to impart to a shank-piece, while being manufactured, the requisite curvature and bevel of its two opposite longer edges, such invention consisting in the combination of a vibratory shank-holder with a cutting-blade, (having its cutting-edge curved in two directions, as hereinafter specified,) and with a bed slanting or inclined to the plane of motion of the said blade, all being essentially as shown and described; also, in the combination of a bed, substantially as represented, with a knife curved in two directions on its cutting-edge, as described, and provided with mechanism to cause it to cut through the blank, down to and at an inclination to the blank-supporting surface of the bed without going through such bed, all being substantially as set forth.

Figure 1:
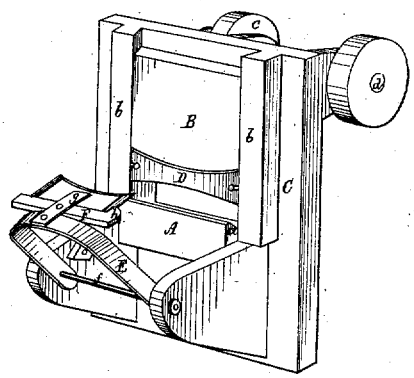
Figure 2:
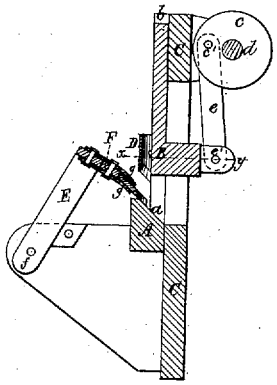
Figure 3:
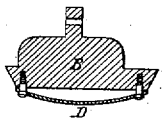
Figure 4:
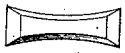

In the drawings, Figure 1 is a perspective view of so much of a shank-cutting machine as, with the other figures, may be required to illustrate my invention. Fig. 2 is a longitudinal and central section of the parts shown in said Fig. 1. Fig. 3 is a horizontal and transverse section of the cutting-blade and its stock, such section being taken through a line from *x* to *y* of Fig. 2. Fig. 4 is a top view of a shank-piece shaped on its longer edges by means of the machine, the bevels of its two ends being otherwise effected.

The bed for supporting the shank-blank during the operation of cutting it, to give it the requisite bevel and curve of either longer edge, is represented at A as having the material or blank sustaining surface *a* inclined at an acute angle with the path of motion of the cutting-blade D. The cutter-stock B, applied to the frame C so as to be capable of being moved therein rectilinearly, both toward and away from the said surface *a*, is represented as arranged between and against two parallel guides, *b b*, whose inner edges are inclined to the frame C. Hinged or pivoted to the stock B is a rod, *e*, which is also pivoted to and extended from a crank-pin, *c'*, projecting from a wheel, *c*, fixed on a shaft, *d*. The said shaft, when in revolution, causes, through the instrumentality of the connecting-rod, a reciprocating rectilinear movement to be imparted to the stock B, which is provided with a cutter or blade, D, which, near its ends, is fixed to the stock. The cutting-blade, between its supports, and with reference to the stock, is bowed or arched, as shown in Fig. 3, and its lower edge is curvilinear and concave, to fit to the surface *a* of the inclined bed A, or to impart to the edge of a shank-blank the proper curve and bevel.

Were the cutting-edge of the blade to be curved in one direction only—that is, as shown in Fig. 3—the middle only of such edge would come in contact with the slanting bed on depression of the blade against such; but by properly arching the cutting-edge vertically, as well as horizontally, it will be caused to fit throughout to the inclined surface of the bed, when in contact therewith.

To sustain the blank preparatory to and while being cut, I provide for it a holder and a gage or support piece, the said gage being represented at F and the holder at E. The latter consists of a frame or yoke, pivoted near its ends upon a rod, *f*, and provided at its middle with elastic jaws *g g*, to extend across and embrace the gage F, which, at its middle, is fastened to such jaws. They project beyond it in manner as shown, and are designed to receive between them, against the inner edges of the gage, the shank-blank, and hold it preparatory to and while being cut on the surface *a* by the blade. This shank-gage has a heel or part, *h*, standing at a right angle to the rest.

After a shank-blank may have been duly applied to the holder and gage, which, during the application, have occupied positions as represented in Fig. 1, the holder should be swung or moved forward, so as to carry the projecting part of the blank over and upon the surface *a*. This having been done, the cutting-blade D should be forced down against and so as to cut through the blank, whereby such blank will be curved and beveled along one edge of it. After such may have been accomplished, the holder should be retracted, and the blank should be turned about in it, so as to enable its opposite longer edge to be reduced on the holder next being moved forward, so as to carry the blank upon the surface *a*, and the blade being depressed on and through the blank, as before described. In this manner the blank becomes curved and beveled on both of its opposite longer edges, as represented in Fig. 4.

Different gages may be provided for different sizes and styles of shanks, and the curvatures of the edge of the cutting-blade may be varied according to the peculiar curve and bevel required to be imparted to the shank-edge.

The beveling and trimming of the ends of the shank-blank may be effected by means of a straight blade or cutter, or by other suitable means.

Having described my invention, what I claim, and desire to secure by Letters Patent, is—

1. The combination of the vibratory shank-holder with the cutting-blade, (having its cutting-edge curved in two directions, as specified,) and with the bed slanting or inclined to the plane of motion of the said blade, all being constructed and to operate substantially as shown and explained.

2. For supporting a shank-stiffener blank, and cutting it from its upper to its lower surface, concave and beveling along its edge, the combination of a bed, substantially as represented, with a knife curved in two directions on its cutting-edge, as described, and provided with mechanism to cause it to cut through the blank, down to and at an inclination to the blank-supporting surface of the bed without going through such bed, all being essentially as explained.

WATSON N. SPRAGUE.

Witnesses:
R. H. EDDY,
J. R. SNOW.